Sept. 5, 1944.     H. J. MALLON     2,357,481
AIRCRAFT TRAINING APPARATUS
Filed June 5, 1943     3 Sheets-Sheet 1
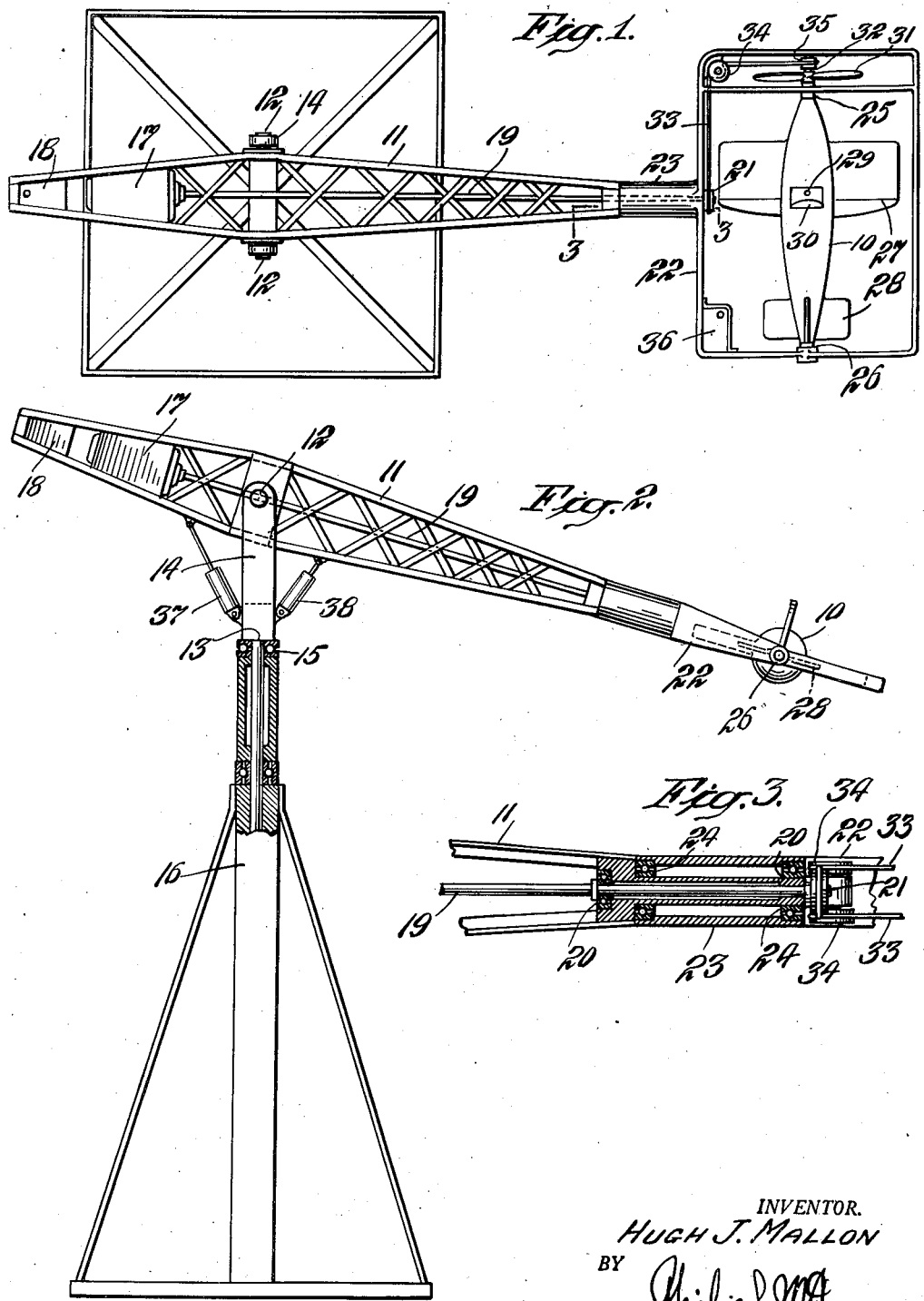
INVENTOR.
HUGH J. MALLON
BY
ATTORNEY

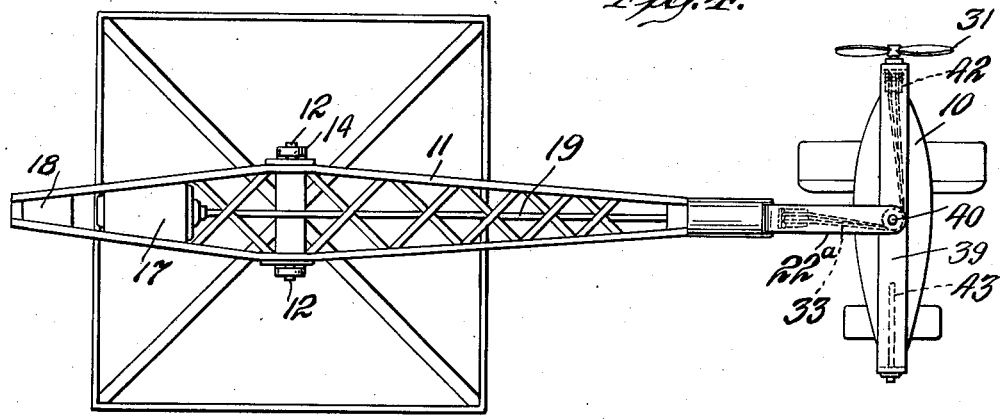
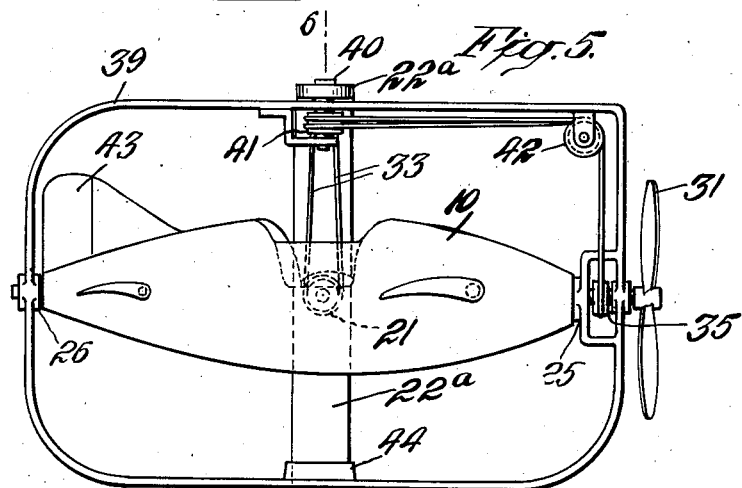
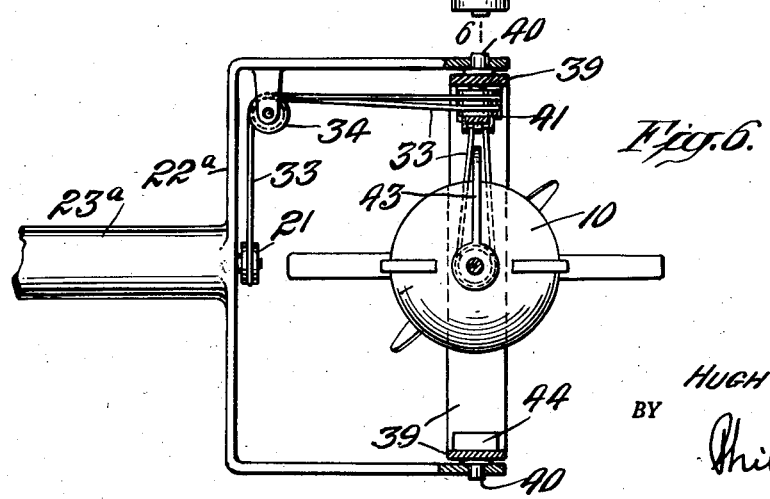

Sept. 5, 1944.     H. J. MALLON     2,357,481
AIRCRAFT TRAINING APPARATUS
Filed June 5, 1943     3 Sheets-Sheet 3
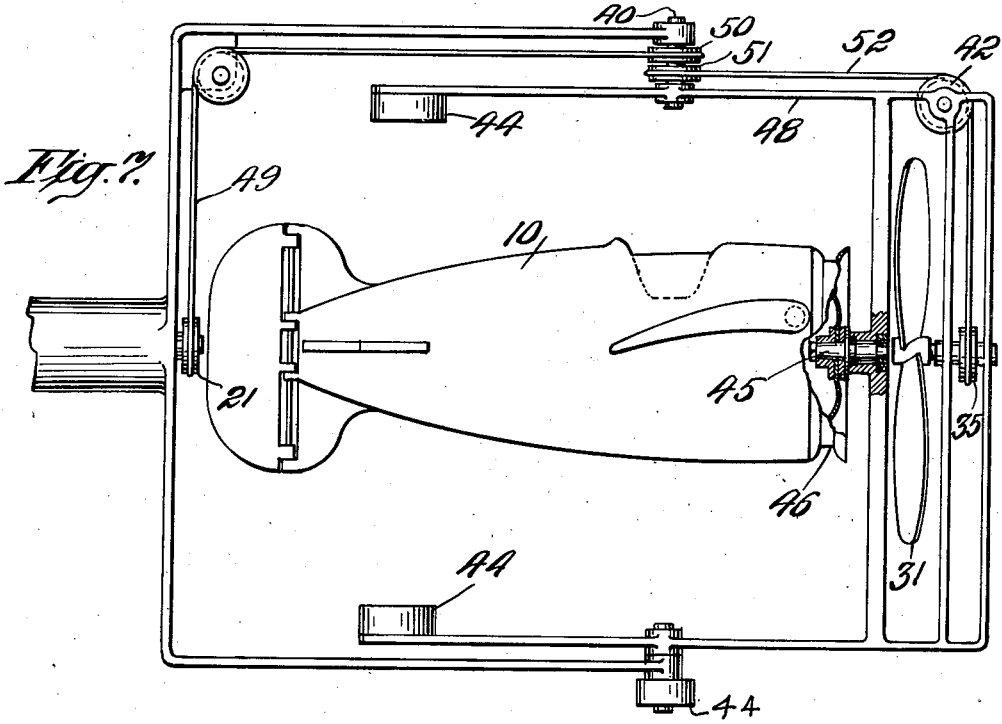
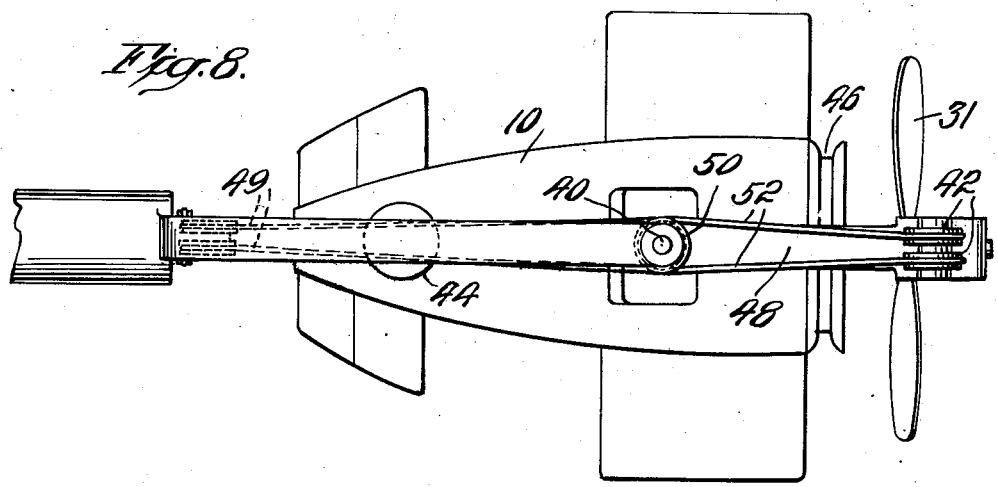
INVENTOR.
HUGH J. MALLON
BY
ATTORNEY Patented Sept. 5, 1944

2,357,481

UNITED STATES PATENT OFFICE 2,357,481

AIRCRAFT TRAINING APPARATUS

Hugh James Mallon, West New York, N. J.

Application June 5, 1943, Serial No. 489,838

4 Claims. (Cl. 35—12)

The invention herein disclosed relates to apparatus for training students in the handling of aircraft.

Objects of the invention are to provide apparatus which will give the student a realistic concept of flying and proper use of the controls to maintain flight and perform necessary evolutions and which will be of a reasonable cost and size, making it practical for general training purposes.

Other more specific objects will become apparent as the specification proceeds.

The drawings accompanying and forming part of the specification illustrate certain present practical embodiments of the invention. The structure however may be further modified and changed, all within the true intent and broad scope of the invention as hereinafter defined and claimed.

Fig. 1 in the drawings is a plan view illustrating one embodiment of the invention.

Fig. 2 is a side elevation and part sectional view of the same.

Fig. 3 is an enlarged broken sectional detail on substantially the plane of line 3—3 of Fig. 1.

Fig. 4 is a plan view of another form of the invention.

Fig. 5 is an enlarged side view of the car or fuselage structure in this second form of the invention.

Fig. 6 is a broken sectional view as on substantially the plane of line 6—6 of Fig. 5.

Figs. 7 and 8 are broken side and plan views illustrating a further modification or embodiment of the invention.

In the several embodiments of the invention illustrated, a fuselage structure is provided such as indicated at 10, having more or less conventional controls and mounted for movements which will enable it to respond to those controls, on the end of a beam 11, pivoted for movement about a horizontal axis 12, and for rotation on a vertical axis 13.

The beam may be of light lattice-work construction and it is shown supported intermediate its ends on the horizontal pivots 12, in a yoke 14, carried by the vertical pivot shaft 13, the latter suitably journalled at 15, in a supporting stand or post structure 16.

A power unit, such as an internal combustion engine 17, is shown mounted within the lattice structure of the beam on the opposite side of the pivot center from the fuselage, so as to act as a counterbalance for the latter and a weight, such as a variable liquid balance may be located at the extreme end of the beam as indicated at 18.

A drive shaft 19, is shown extending from the motor longitudinally of the beam, through the horizontal pivot center 12. This shaft as shown in Fig. 3, is journalled in suitable bearings 20, in the end portion of the beam and carries at its end a pulley 21.

Journalled axially of the beam and concentrically about the drive shaft 19, is a fuselage mounting yoke 22, shown as having a sleeve portion 23, carried on bearings 24, concentric with the shaft bearings 20.

In the first illustrated form of the invention, the fuselage 10, is directly journalled at its ends, at 25, 26, in the arms of the yoke 22, so that it may rotate for banking movements. The pivoting of the yoke on the end of the beam provides for the pitching or ascending and descending movements of the fuselage.

The aerodynamic controls required for effecting or counteracting movements of the fuselage about the longitudinal axis and about the transverse axis are indicated at 27 and 28, in the nature of ailerons and elevators, respectively.

Details of the means for actuating the ailerons and elevators are not shown, since these may be of conventional type controlled by a "stick" such as indicated at 29. It is contemplated though that this control stick or other member will be counterweighted or counterbalanced, so that it will return to a neutral position to normally restore the fuselage to level balanced flight.

The seat 30, is shown disposed in line with the pivotal axis of the supporting yoke and disposed so that the weight of the student will balance the fuselage in upright position.

The force for propelling the fuselage and inducing the various evolutions for which it is suited is provided in the illustration by a propeller or air screw 31, carried by shaft 32, journalled in the arm of yoke 22, in line with the longitudinal axis mounting of the fuselage. This propeller thus turns independently of the pivotal mounting of the fuselage, leaving the fuselage free of any propeller torque.

The driving of the propeller is accomplished in the illustration by a belt or belting 33, running from the shaft end pulley 21, over guide pulleys 34, in the corner of the yoke to a pulley 35, on the propeller shaft 32.

The opposite arm of the yoke is indicated as counterbalanced, as by means of a water tank 36, to offset the weight of the belt drive connections and propeller.

The beam may be controlled as to rising or lowering movements and actual height of the fuselage from the ground, as by means of hydraulic power cylinders, such as indicated at 37, 38, Fig. 1, carried by the supporting yoke 14, and connected with the beam at opposite sides of pivotal center 12.

In the form of the invention illustrated in Figs. 4, 5 and 6, rudder or steering control is provided for in addition to the banking and pitching movements. This is accomplished by mounting the fuselage on a longitudinally rotatable axis within a second yoke or frame 39, journalled transversely on bearings 40, between the arms of the first pivotally mounted supporting yoke 22a.

In this case, the drive belt 33, for the propeller extends from the drive pulley 21, over the guide pulleys 34, in the corner of the first yoke and then over guide pulleys 41, in line with the axial mounting 40, of the second yoke and then over guide pulleys 42, in the corner of the second yoke down to the pulley 35, on the propeller shaft.

The fuselage is shown equipped with a rudder 43, and the yokes or frames are indicated as counterweighted as at 44, where necessary or desirable to balance them for free movement about the several axes.

The arms of the first mounting yoke 22a, may be long enough to permit the fuselage to rotate completely about the vertical axis 40, or the motion may be limited so that the fuselage can only swing one way or the other without making a complete revolution. Similarly, the fuselage may be mounted free to rotate completely about its longitudinal axis, but here also, if desired, there may be means for limiting such motions to certain predetermined angles of movement.

In the third embodiment of the invention illustrated, Figs. 7 and 8, there is provision for motion about all three axes, but the fuselage is supported entirely from one end instead of being pivotally mounted at both ends. This follows the construction of the earlier Mallon Patent 1,945,697, in which the fuselage body 10, is carried by a disc wheel 46 fixed on a central shaft 45, journalled in a bearing 47 carried by the inner or second yoke 48, and which latter, as in the second form of the invention described, carries the propeller 31, in line with the axial mounting of the fuselage.

Fig. 7 also shows how the belt drive may be made in two sections, with one belt 49, running from drive pulley 21, to a pulley 50, concentric with the axial mounting of the second yoke and connected with a pulley 51, on which a second belt 52, runs to the propeller pulley 35.

Other variations of belting may be employed, arranged to carry the drive around the several axes of fuselage movement and such belting may be protected, by running it through tubular guards or shields.

The invention, in all forms, provides a sense of free flight, in which motion is attained by propeller force and controls are effected aerodynamically in practically the same way as in actual flight. The apparatus is relatively simple and may be set up in the open or within a housing structure, since the space required is determined only by the rotary sweep and rise and fall of the supporting arm or beam. If mounted within a building, the beam may be suspended from above, instead of being supported from below. The motor provides a desirable counterbalance for the fuselage and mounting it directly on the beam provides a straight through simple form of drive. The belt and pulley driv-ing connections and the mounting of the propeller independently of the fuselage provide desirable simplicity and low cost and avoids all torque reaction on the fuselage, leaving the latter free to respond to its controls. To keep the belt speed down within reasonable limits, a four-bladed propeller may be used and if desired, reduction gearing may be interposed between the engine shaft and drive shaft.

What is claimed is:

1. An aircraft trainer, comprising a beam pivoted intermediate its ends on a horizontal axis and swivelled for rotation about a vertical axis, a motor mounted on said beam at one side of the pivotal support, a yoke journalled on the beam at the other side of the pivotal support on an axis longitudinal of the beam, a pulley substantially on the axis of said yoke, a drive shaft extending from said motor longitudinally of the beam into driving relation with said pulley, a fuselage pivotally mounted on said yoke, a propeller mounted on substantially the longitudinal center of said fuselage and belt drive connections for said pulley extending from said first mentioned pulley and including pulleys for carrying said belt connections about the pivotally mounted yoke and pivotally supported fuselage.

2. An aircraft trainer, comprising a beam pivoted intermediate its ends on a horizontal axis and swivelled for rotation about a vertical axis, a motor mounted on said beam at one side of the pivotal support, a yoke journalled on the beam at the other side of the pivotal support on an axis longitudinal of the beam, a pulley substantially on the axis of said yoke, a drive shaft extending from said motor longitudinally of the beam into driving relation with said pulley, a fuselage pivotally mounted on said yoke, a propeller mounted on substantially the longitudinal center of said fuselage and belt drive connections for said pulley extending from said first mentioned pulley and including pulleys for carrying said belt connections about the pivotally mounted yoke and pivotally supported fuselage, the pivotal mounting for the fuselage including a second angularly related yoke pivotally mounted in the first yoke and supporting the fuselage for banking, pitching and steering movements and there being belt connections and pulleys for carrying the drive about the mounting center of said second yoke.

3. An aircraft trainer, comprising a beam mounted for rotation about a vertical axis and for rising and lowering movement about a horizontal axis, a yoke journalled in one end of the beam on an axis substantially longitudinal of the beam, a power source on the beam at the opposite side of the pivotal center of the beam from said yoke, drive shafting extending from said power source longitudinally of the beam and substantially through the pivotal axis of said yoke, a fuselage journalled on its longitudinal axis in said yoke, a propeller mounted in said yoke in line with said fuselage and substantially on the longitudinal axis of said fuselage and belt drive connections extending from the end of said power shaft to said propeller, said fuselage having aerodynamic controls for utilizing the propeller blast to effect various evolutions of said fuselage.

4. An aircraft trainer, comprising a beam mounted for rotation about a vertical axis and for rising and lowering movement about a horizontal axis, a yoke journalled in one end of the beam on an axis substantially longitudinal of the beam, a power source on the beam at the opposite side of the pivotal center of the beam from said yoke, drive shafting extending from said power source longitudinally of the beam and substantially through the pivotal axis of said yoke, a fuselage journalled on its longitudinal axis in said yoke, a propeller mounted in said yoke in line with said fuselage and substantially on the longitudinal axis of said fuselage and belt drive connections extending from the end of said power shaft to said propeller, said fuselage having aerodynamic controls for utilizing the propeller blast to effect various evolutions of said fuselage and power cylinders connected with the beam at opposite sides of the pivotal center of the same and acting on the beam at opposite sides of its pivotal center for effecting positive raising and lowering of the beam.

HUGH JAMES MALLON.